United States Patent
Nakahira et al.

(10) Patent No.: US 12,089,290 B2
(45) Date of Patent: Sep. 10, 2024

(54) WIRELESS COMMUNICATION METHOD, BASE STATION, AND WIRELESS COMMUNICATION SYSTEM

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 340 days.

(21) Appl. No.: 17/603,960

(22) PCT Filed: Apr. 17, 2020

(86) PCT No.: PCT/JP2020/016894
§ 371 (c)(1),
(2) Date: Oct. 15, 2021

(87) PCT Pub. No.: WO2020/218197
PCT Pub. Date: Oct. 29, 2020

(65) Prior Publication Data
US 2022/0210634 A1   Jun. 30, 2022

(30) Foreign Application Priority Data
Apr. 22, 2019 (JP) .................................. 2019-081321

(51) Int. Cl.
*H04W 8/22* (2009.01)
*H04W 48/18* (2009.01)
(Continued)

(52) U.S. Cl.
CPC ............. *H04W 8/22* (2013.01); *H04W 48/18* (2013.01); *H04W 84/12* (2013.01); *H04W 88/06* (2013.01); *H04W 88/10* (2013.01)

(58) Field of Classification Search
None
See application file for complete search history.

(56) References Cited

U.S. PATENT DOCUMENTS

| | | | | |
|---|---|---|---|---|
| 2010/0302958 | A1* | 12/2010 | Wietfeldt | .............. H04W 76/15 370/252 |
| 2015/0208336 | A1 | 7/2015 | Lihoshi et al. | |

FOREIGN PATENT DOCUMENTS

| | | | | |
|---|---|---|---|---|
| EP | 2051494 A1 * | 4/2009 | ............ H04W 12/06 |
| JP | 2012529229 A | 11/2012 | |
| JP | 2015529985 A | 10/2015 | |

OTHER PUBLICATIONS

Aruba, a Hewlett Packard Enterprise company, How does wifi to cellular handoff assist works in Aruba OS 6.5?, Airheads Community, Controller Based WLANs, Mar. 24, 2017, https://community.arubanetworks.com/t5/Controller-Based-WLANs/How-does-wifi-to-cellular-handoff-assist-works-in-Aruba-OS-6-5/ta-p/291873.

* cited by examiner

*Primary Examiner* — Jinsong Hu
*Assistant Examiner* — Alexander J Yi
(74) *Attorney, Agent, or Firm* — Harness, Dickey & Pierce, P.L.C.

(57) ABSTRACT

A radio communication method of connecting a base station with a plurality of terminal stations, the base station including a plurality of radio communication units compatible with a predetermined communication standard, the method including collecting additional-line information including information regarding whether each terminal station is compatible with additional communication standard; collecting (Continued)

request information including a request in the predetermined communication standard of each terminal station; collecting identifier information that identifies each terminal station; calculating, based on the additional-line information, the request information and the identifier information that are collected, a setting policy including a setting for each radio communication unit, and a switching policy of setting a condition for switching the plurality of radio communication units; and setting, for each radio communication unit, the terminal station to be connected based on the setting policy and the switching policy that are calculated.

6 Claims, 10 Drawing Sheets

(51) Int. Cl.
*H04W 84/12* (2009.01)
*H04W 88/06* (2009.01)
*H04W 88/10* (2009.01)

| POLICY NUMBER | APPLICATION DESTINATION RADIO COMMUNICATION UNIT | RADIO SETTING |
|---|---|---|
| O1 | RADIO COMMUNICATION UNIT 21-1 | • BASIC RATE : 6 Mbps<br>• MINIMUM DATA RATE : 6 Mbps<br>• CONNECTION PERMISSION POWER THRESHOLD : NOT SET<br>• DISCONNECTION PROCESS POWER THRESHOLD : NOT SET |
| O2 | RADIO COMMUNICATION UNIT 21-2 | • BASIC RATE : 24 Mbps<br>• MINIMUM DATA RATE : 24 Mbps<br>• CONNECTION PERMISSION POWER THRESHOLD : -70 dBm<br>• DISCONNECTION PROCESS POWER THRESHOLD : -75 dBm |
| ⋮ | ⋮ | ⋮ |

Fig. 5

| POLICY NUMBER | SETTING POLICY NUMBER OF SWITCHING SOURCE | SETTING POLICY NUMBER OF SWITCHING DESTINATION | SWITCHING CONDITION |
|---|---|---|---|
| I | 01 | 02 | TERMINAL STATION OF TYPE ii |
| II | 02 | 01 | TERMINAL STATION OF TYPE i |
| ⋮ | ⋮ | ⋮ | ⋮ |

Fig. 6

| TYPE NUMBER | ADDITIONAL-LINE INFORMATION | REQUEST INFORMATION | |
|---|---|---|---|
| | COMPATIBILITY WITH CELLULAR COMMUNICATION | MINIMUM BASIC RATE | ... |
| i | × | Φ | ... |
| ii | ○ | Φ | ... |
| ⋮ | ⋮ | ⋮ | ⋮ |

○ : COMPATIBLE
× : NOT COMPATIBLE
Φ : NOT CARED

Fig. 7

| TYPE NUMBER | ADDITIONAL-LINE INFORMATION | REQUEST INFORMATION | | |
|---|---|---|---|---|
| | COMPATIBILITY WITH CELLULAR COMMUNICATION | MINIMUM BASIC RATE | MINIMUM DATA RATE | ... |
| i | Φ | 6M | 6M | ... |
| ii | Φ | 24M | 24M | ... |
| ⋮ | ⋮ | ⋮ | ⋮ | ⋮ |

○ : COMPATIBLE
× : NOT COMPATIBLE
Φ : NOT CARED

WIRELESS COMMUNICATION METHOD, BASE STATION, AND WIRELESS COMMUNICATION SYSTEM

CROSS-REFERENCE TO RELATED APPLICATIONS

This application is a 371 U.S. National Phase of International Application No. PCT/JP2020/016894 filed on Apr. 17, 2020, which claims priority to Japanese Application No. 2019-081321 filed on Apr. 22, 2019. The entire disclosures of the above applications are incorporated herein by reference.

TECHNICAL FIELD

The present invention relates to a radio communication method, a base station and a radio communication system.

BACKGROUND ART

As a high-speed radio access system using radio waves of a license-free band, there is the IEEE 802.11 wireless LAN standard, which specifies various standards such as 11a, 11b, 11g, 11n and 11ac with different radio frequency bands, radio transmission techniques, and radio transmission rates.

The 11b standard is a radio transmission rate of up to 11 Mbps using the 2.4 GHz band. The 11a standard is a radio transmission rate of up to 54 Mbps using the 5 GHz band. The 11g standard is a radio transmission rate of up to 54 Mbps using the 2.4 GHz band. The 11n standard is a radio transmission rate of up to 600 Mbps utilizing 2.4 and 5 GHz bands. The 11ac standard is a radio transmission rate of up to 6900 Mbps using the 5 GHz.

These various IEEE 802.11 wireless LAN standards are backward compatible and can be used in a mixed environment. Cellular communication methods for mobile use, such as code division multiple access (CDMA), long term evolution (LTE), and LTE-Advanced, have also been specified as high-speed radio access systems using radio waves in a licensed band.

Of various available radio terminals (terminal stations), especially radio terminals for mobile applications such as smartphones and tablets are in many cases compatible with both license-free band radio systems such as wireless LAN and licensed band radio systems such as cellular systems. For example, users can choose to use wireless LAN communication at home or in the office, and cellular communication when they are out or on the move.

On the other hand, there are devices such as personal computers and smart speakers that are considered to be mainly used in a static environment at home or in the office. There are also devices that are not compatible with cellular communication for the purpose of reducing equipment costs and running costs. Thus, there are many radio terminals that are compatible with wireless LAN communication but are not compatible with cellular communication.

In particular, in public areas such as train stations, airports, and shopping malls, an unspecified number of users use wireless LANs, and in this case, various radio terminals are used in a mixed manner. Therefore, the requirements of the radio terminals for the wireless LAN system and the optimal radio parameters to meet the requirement needs are expected to differ depending on whether the terminals using the wireless LAN are compatible with radio systems other than the wireless LAN, such as cellular communications.

For example, the requirements of a radio terminal that can use only wireless LAN may include a desire to use wireless LAN communication in as wide an area as possible, a desire not to perform handover to cellular communication, and the like. On the other hand, the requirements of a radio terminal that is compatible with cellular communication other than wireless LAN may include a desire to use wireless LAN only when the communication quality is high, a desire to perform handover to cellular communication, and the like.

Currently, however, the control from the radio base station (base station) side is limited to simple control (see, for example, NPTL 1), such as uniform disconnection for radio terminal stations that fall below a predetermined reception strength.

CITATION LIST

Non Patent Literature

NPTL 1: Airheads Community, Controller Based WLANs, "How does wife to cellular handoff assist works in Aruba OS 6.5?", [online], Mar. 24, 2017, a Hewlett Packard Enterprise company, [searched on Feb. 18, 2019], the Internet <URL:https://community.arubanetworks.com/t5/Controller-Based-WLANs/How-does-wifi-to-cellular-handoff-assist-works-in-Aruba-OS-6-5/ta-p/291873>

SUMMARY OF THE INVENTION

Technical Problem

In a wireless LAN environment used by an unspecified number of users, terminal stations are used in a mixed manner regardless of whether they are compatible with cellular communication. In the known wireless LAN systems, it is difficult to perform a control distinguishing whether cellular communication is supported, and an optimal setting in accordance with requirements.

An object of the present invention is to provide a radio communication method, a base station and a radio communication system that can achieve an efficient radio communication in the case where a terminal station that is compatible with a predetermined communication standard and a terminal station that is compatible with another communication standard in addition to the predetermined communication standard are mixed.

Means for Solving the Problem

A radio communication method according to an aspect of the present invention is a method of connecting a base station with a plurality of terminal stations, the base station including a plurality of radio communication units compatible with a predetermined communication standard, the method including collecting, from each of the plurality of terminal stations, additional-line information including information regarding whether the terminal station is compatible with an additional communication standard, collecting, from each of the plurality of terminal stations, request information including a request in the predetermined communication standard of the terminal station, collecting, from each of the plurality of terminal stations, identifier information that identifies the terminal station, calculating, based on the additional-line information, the request information and the identifier information that are collected, a setting policy including a setting for each of the plurality of radio communication units, and a switching policy of setting a condition for switching the plurality of radio communication units, and setting, for each of the plurality of radio communication units, the terminal station to be connected based on the setting policy and the switching policy that are calculated.

In the radio communication method according to an aspect of the present invention, the predetermined communication standard is a communication standard for configuring a wireless LAN, and the additional communication standard is a communication standard for implementing cellular communication.

In the radio communication method according to an aspect of the present invention, the setting policy includes a radio setting based on a plurality of different communication standards calculated based on the additional-line information or the request information, and any of a plurality of different setting policies is set for each of the plurality of radio communication units.

A base station according to an aspect of the present invention is configured to connect a plurality of terminal stations, the base station including a plurality of radio communication units compatible with a predetermined communication standard, an additional-line information collection unit configured to collect, from each of the plurality of terminal stations, additional-line information including information regarding whether the terminal station is compatible with an additional communication standard, a request information collection unit configured to collect, from each of the plurality of terminal stations, request information including a request in the predetermined communication standard of the terminal station, an identifier collection unit configured to collect, from each of the plurality of terminal stations, identifier information that identifies the terminal station, a setting unit configured to set, for each of the plurality of radio communication units, the terminal station to be connected in accordance with a switching policy of setting a condition for switching the plurality of radio communication units and a setting policy including a setting for each of the plurality of radio communication units, the switching policy and the setting policy being calculated based on the additional-line information, the request information and the identifier information that are collected.

In the base station according to an aspect of the present invention, the predetermined communication standard is a communication standard for configuring a wireless LAN, and the additional communication standard is a communication standard for implementing cellular communication.

In the base station according to an aspect of the present invention, the setting policy includes a radio setting based on a plurality of different communication standards calculated based on the additional-line information or the request information, and the setting unit sets, for each of the plurality of radio communication units, any of a plurality of different setting policies.

A radio communication system according to an aspect of the present invention includes a plurality of base stations including a plurality of radio communication units that are compatible with a predetermined communication standard and are connectable to a plurality of terminal stations, and a control station configured to control each of the plurality of base stations, wherein each of the plurality of base stations includes an additional-line information collection unit configured to collect, from each of the plurality of terminal stations, additional-line information including information regarding whether the terminal station is compatible with an additional communication standard, a request information collection unit configured to collect, from each of the plurality of terminal stations, request information including a request in the predetermined communication standard of the terminal station, an identifier collection unit configured to collect, from each of the plurality of terminal stations, identifier information that identifies the terminal station, and a setting unit configured to set, for each of the plurality of radio communication units, the terminal station to be connected based on a setting policy and a switching policy, and the control station includes a policy calculation unit configured to calculate a switching policy of setting a condition for switching the plurality of radio communication units and a setting policy including a setting for each of the plurality of radio communication units based on the additional-line information, the request information and the identifier information that are collected by each of the plurality of base stations, and a communication unit configured to transmit, to each of the plurality of base stations, the setting policy and the switching policy that are calculated by the policy calculation unit.

In the radio communication system according to an aspect of the present invention, the predetermined communication standard is a communication standard for configuring a wireless LAN, and the additional communication standard is a communication standard for implementing cellular communication.

In the radio communication system according to an aspect of the present invention, the setting policy includes a radio setting based on a plurality of different communication standards calculated based on the additional-line information or the request information, and the setting unit sets, for each of the plurality of radio communication units, any of a plurality of different setting policies.

Effects of the Invention

According to the present invention, it is possible to achieve an efficient radio communication in the case where a terminal station that is compatible with a predetermined communication standard and a terminal station that is compatible with another communication standard in addition to the predetermined communication standard are mixed.

DESCRIPTION OF EMBODIMENTS

Figure 1:
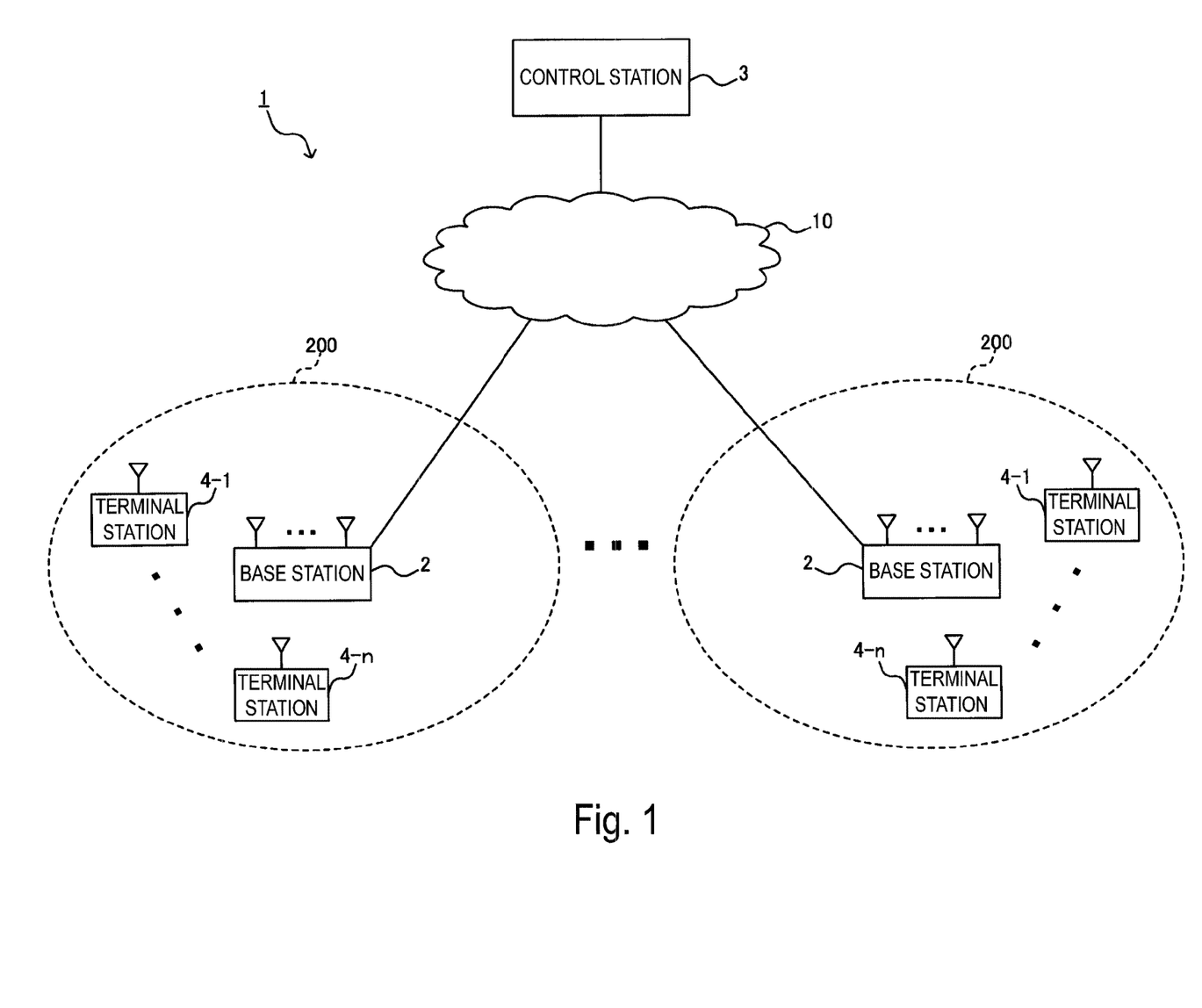
FIG. 1 illustrates an exemplary configuration of a radio communication system according to an embodiment.

An embodiment of a radio communication system is described below with reference to the drawings. FIG. 1 illustrates an exemplary configuration of a radio communication system 1 according to an embodiment. As illustrated in FIG. 1, in the radio communication system 1, for example, a plurality of base stations 2 are connected to a control station 3 through a network 10. In addition, each base station 2 accommodates a plurality of various terminal stations such as n terminal stations 4-1 to 4-n within a service area 200, which is a range where radio communication is possible.

Here, the terminal stations 4-1 to 4-n indicate that a terminal station that is compatible with only wireless LAN and a terminal station that is compatible with cellular communication as well as wireless LAN are mixed, for example. It is to be noted that the number n of the terminal stations 4 to be accommodated and the individual types of the terminal stations 4 may be different for each base station 2.

In the following description, a line compatible with wireless LAN communication standards is referred to as a predetermined line, and a line compatible with cellular communication standards is referred to as an additional line. In addition, the terminal stations 4-1 to 4-n are a plurality of terminal stations compatible with different communication standards, but when they are not individually specified, they are simply referred to as the terminal station 4.

Figure 2:
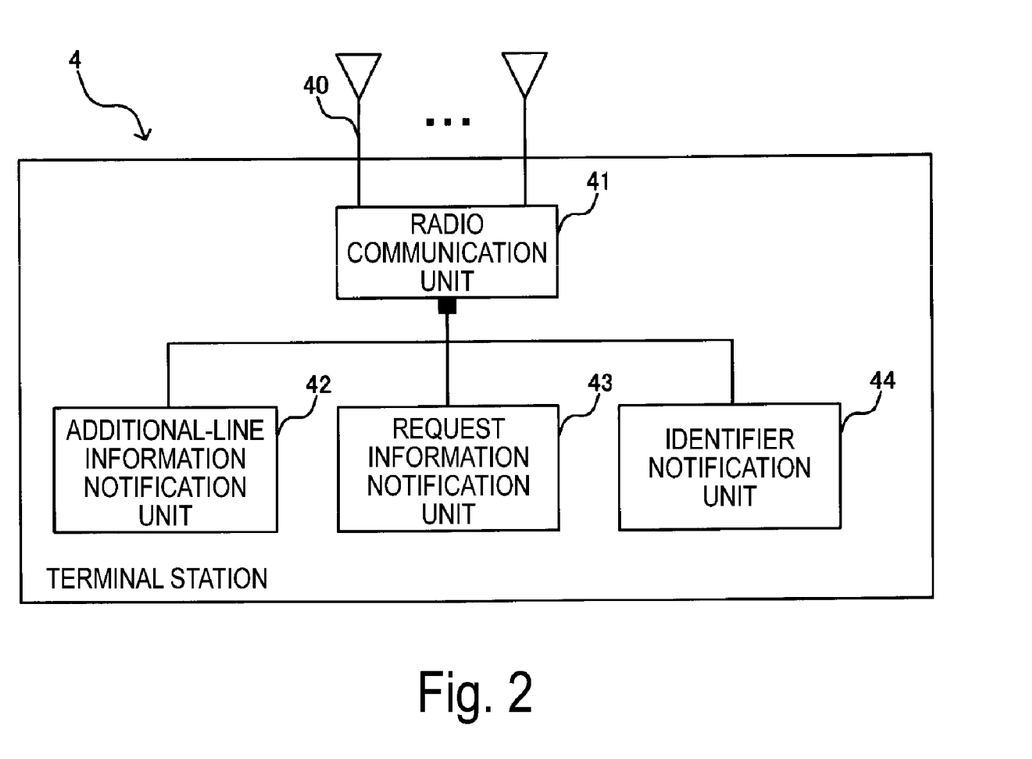
FIG. 2 illustrates an exemplary configuration of a terminal station.

FIG. 2 illustrates an exemplary configuration of the terminal station 4. As illustrated in FIG. 2, the terminal station 4 includes a plurality of antennas 40, a radio communication unit 41, an additional-line information notification unit 42, a request information notification unit 43, and an identifier notification unit 44. It is to be noted that other function blocks that are provided in typical terminal stations are not illustrated.

The antenna 40, which is connected to the radio communication unit 41, transmits a wireless frame input from the radio communication unit 41, and outputs a received wireless frame to the radio communication unit 41.

The radio communication unit 41 converts information input from the additional-line information notification unit 42, the request information notification unit 43, and the identifier notification unit 44 into wireless packets, and transmits the packets through the antenna 40, for example.

The additional-line information notification unit 42 outputs additional-line information of its own station, and notifies the additional-line information of its own station to the base station 2 through the radio communication unit 41 and the antenna 40. The additional-line information includes information related to the additional line of the terminal station 4, such as information regarding whether the terminal station 4 is compatible with the additional line, information regarding whether the additional line is in an available status, and communication quality information of the additional line.

The request information notification unit 43 outputs request information of its own station, and notifies the request information of its own station to the base station 2 through the radio communication unit 41 and the antenna 40. Request information is information representing a condition requested by the terminal station 4 to the radio line provided by the base station 2. For example, the request information includes quality information related to the radio communication with the base station 2, such as the required reception power, the required reception quality, the required transmission rate and the required error rate.

The identifier notification unit 44 outputs identifier information of its own station to notify the identifier information of its own station to the base station 2 through the radio communication unit 41 and the antenna 40. The identifier information includes information that identifies the terminal station 4, such as the serial number and the media access control (MAC) address of the terminal station 4.

It is to be noted that each of the terminal stations 4-1 to 4-n illustrated in FIG. 2 has a configuration substantially identical to that of the terminal station 4, but, as described above, the terminal stations 4-1 to 4-n include a terminal station that is compatible with only wireless LAN and a terminal station that is compatible with cellular communication as well as wireless LAN.

Figure 3:
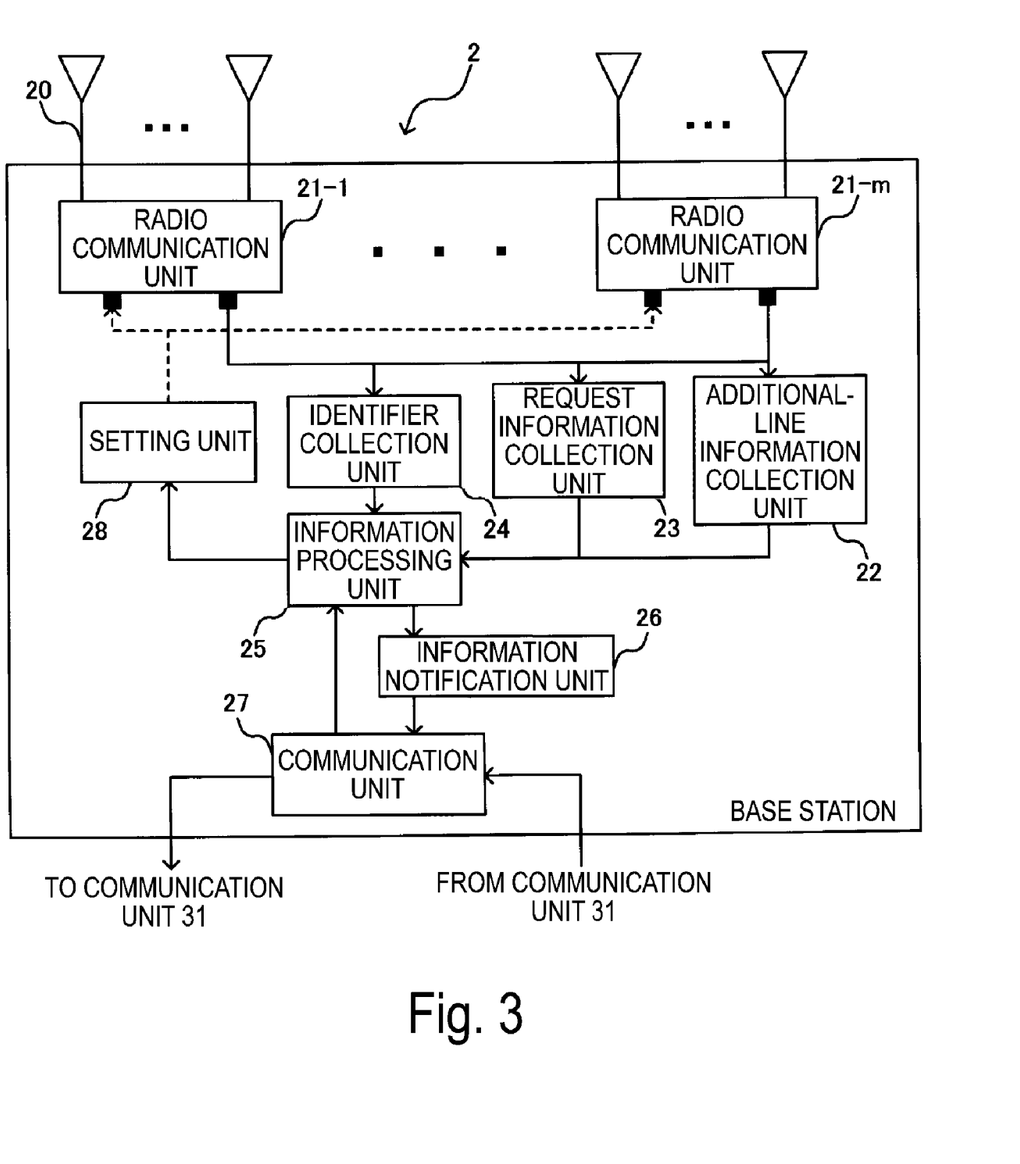
FIG. 3 illustrates an exemplary configuration of a base station according to the embodiment.

FIG. 3 illustrates an exemplary configuration of the base station 2 according to the embodiment. As illustrated in FIG. 3, the base station 2 includes a plurality of antennas 20, m radio communication units 21-1 to 21-m, an additional-line information collection unit 22, a request information collection unit 23, an identifier collection unit 24, an information processing unit 25, an information notification unit 26, a communication unit 27, and a setting unit 28, for example. It is to be noted that when the plurality of configurations such as the radio communication units 21-1 to 21-m is not individually specified, they are simply abbreviated as a radio communication unit 21 or the like. In addition, other function blocks that are provided in typical base stations are not illustrated.

A plurality of the antennas 20, which are connected to each of the radio communication units 21-1 to 21-m, transmits a wireless frame input from the radio communication units 21-1 to 21-m and outputs a received wireless frame to the radio communication units 21-1 to 21-m.

The radio communication units 21-1 to 21-m can each independently perform radio communication with one or more terminal stations (for example, at least any of the terminal stations 4-1 to 4-n) through the plurality of antennas 20, for example. For example, each of the radio communication units 21-1 to 21-m is compatible with wireless LAN communication standards and cellular communication standards, and performs radio communication according to any of the communication standards with the terminal station 4 in accordance with the setting based on a setting policy, a switching policy and a type information, and connection switching determination information described later (see FIG. 10).

The additional-line information collection unit 22 collects additional-line information including information regarding whether the terminal station 4 is compatible with cellular communication standards from each terminal station 4 through the plurality of antennas 20 and the radio communication units 21-1 to 21-m, and outputs the information to the information processing unit 25.

The request information collection unit 23 collects request information including a request in the wireless LAN communication standard of the terminal station 4 from each terminal station 4 through the plurality of antennas 20 and the radio communication units 21-1 to 21-m, and outputs the request to the information processing unit 25.

The identifier collection unit 24 collects identifier information that identifies the terminal station 4 from each terminal station 4 through the plurality of antennas 20 and the radio communication units 21-1 to 21-m, and outputs the information to the information processing unit 25.

The information processing unit 25 includes a CPU and a memory (not illustrated), and combines together, as connection switching determination information, the additional-line information, the request information and the identifier information input from the additional-line information collection unit 22, the request information collection unit 23, and the identifier collection unit 24, respectively. Then, the information processing unit 25 outputs the connection switching determination information to the information notification unit 26 and the setting unit 28. In addition, the information processing unit 25 processes information input from the communication unit 27 (the setting policy, the switching policy and the type information described later), and outputs the information to the setting unit 28.

The information notification unit 26 notifies, to control station 3 through the communication unit 27, the connection switching determination information (the additional-line information, the request information, and the identifier information) combined by the information processing unit 25 and the base station performance information of its own station. The base station performance information is information representing the radio communication performance of the base station 2, and includes information such as the number (m) of the radio communication units 21, the number of the antennas 20, and the compatible radio communication standard (for example, wireless LAN communication standards and cellular communication standards).

The communication unit 27 transmits, to the control station 3 by, for example, a wired communication through the network 10 (FIG. 1), information (the connection switching determination information and the base station performance information of its own station) input from the information notification unit 26, and outputs, to the information processing unit 25, information (the setting policy, the switching policy and the type information described later) input from the control station 3.

The setting unit 28 performs a setting based on the setting policy, the switching policy and the type information input from the information processing unit 25 for each of the radio communication units 21-1 to 21-m. In addition, the setting unit 28 outputs, to each of the radio communication units 21-1 to 21-m, the connection switching determination information input from the information processing unit 25. That is, the setting unit 28 has a function of setting the terminal station 4 to be connected for the radio communication units 21-1 to 21-m in accordance with the setting policy and the switching policy.

Figure 4:
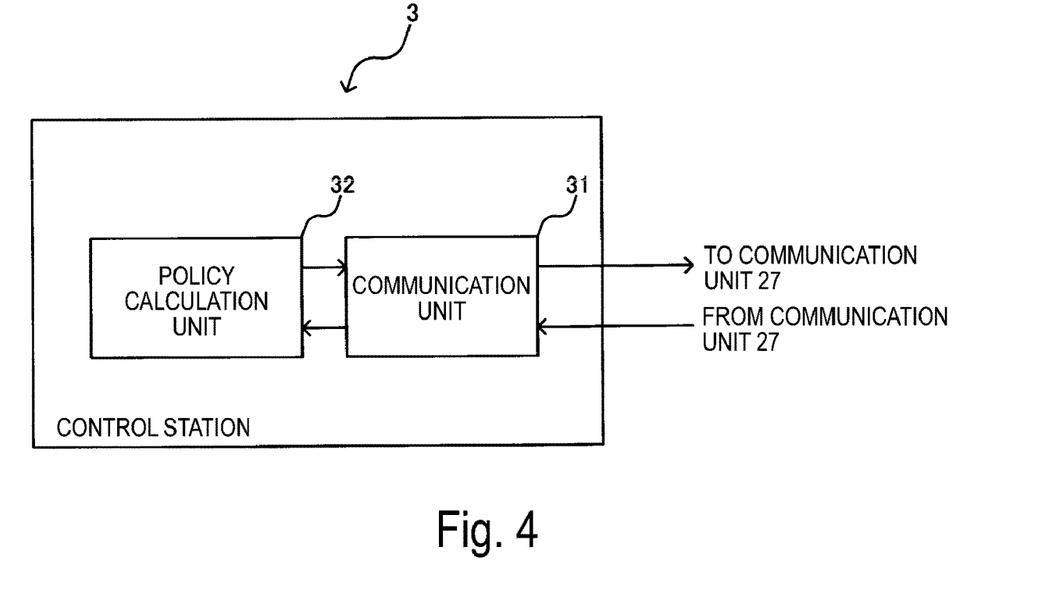
FIG. 4 illustrates an exemplary configuration of a control station.

FIG. 4 illustrates an exemplary configuration of the control station 3. As illustrated in FIG. 4, the control station 3 includes a communication unit 31 and a policy calculation unit 32. It is to be noted that other function blocks that are provided in typical control stations are not illustrated.

The communication unit 31 receives connection switching determination information and base station performance information from each base station 2 by, for example, a wired communication through network 10, and outputs the information to the policy calculation unit 32. In addition, the communication unit 31 transmits each information calculated by the policy calculation unit 32 to each base station 2 through the network 10.

On the basis of the connection switching determination information and the base station performance information input from the communication unit 31, the policy calculation unit 32 calculates the setting policy, the switching policy, and the type information for specifying the types of the terminal stations 4-1 to 4-n for the radio communication units 21-1 to 21-m of each base station 2, and outputs the calculated each piece of information to the communication unit 31. It is to be noted that when the connection switching determination information is not input from the communication unit 31, for example when the radio communication system 1 performs initial setting, the policy calculation unit 32 calculates the setting policy, the switching policy and the type information on the basis of the base station performance information, and outputs the calculated each piece of information to the communication unit 31.

Next, specific examples of the setting policy, the switching policy and the type information are described.

Figure 5:
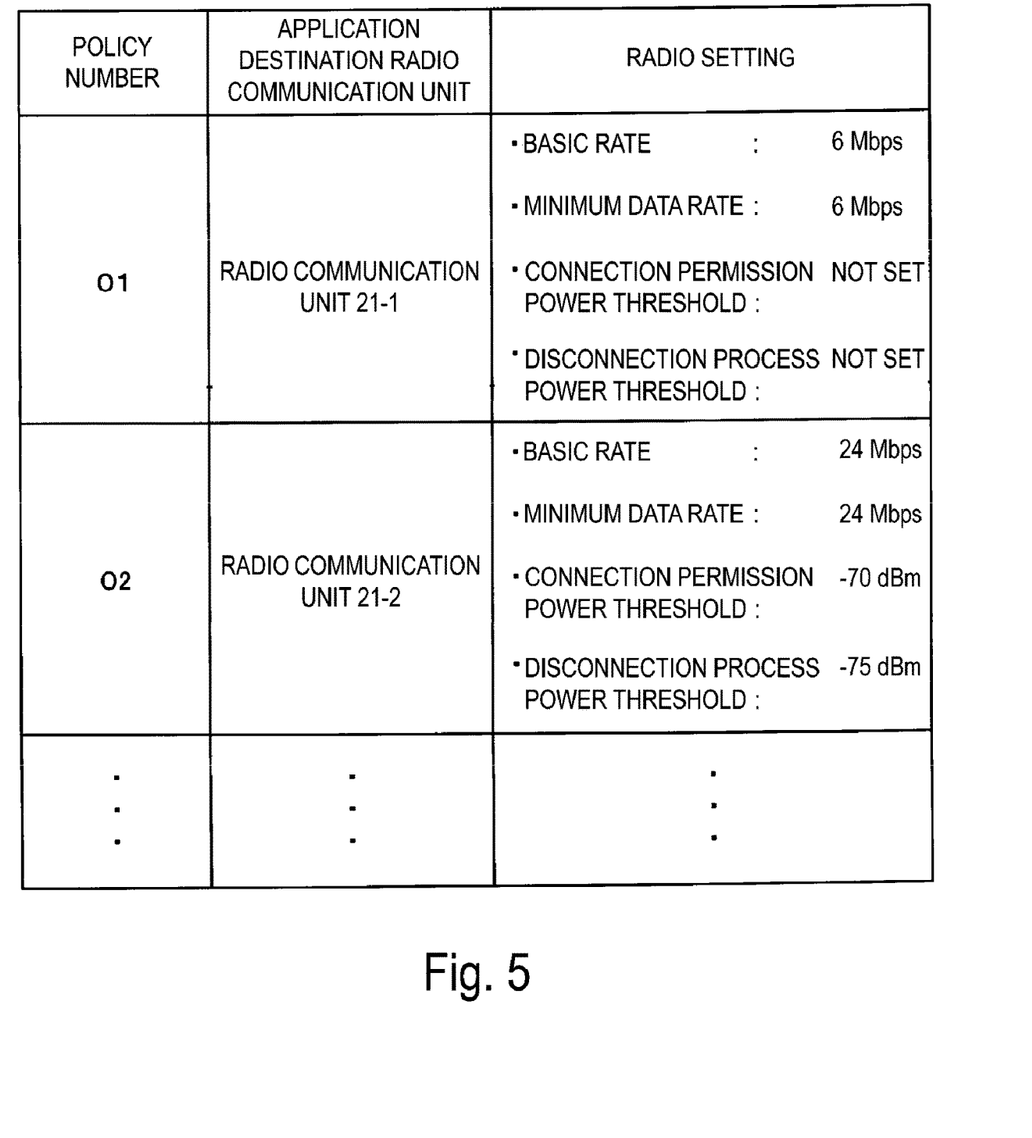
FIG. 5 illustrates an exemplary setting policy.

FIG. 5 illustrates an exemplary setting policy. As illustrated in FIG. 5, the setting policy includes the policy number, the application destination radio communication unit and the radio setting, for example. In the application destination radio communication unit, any of the radio communication units 21-1 to 21-m to which the setting policy specified by the policy number is applied is set. The radio setting includes radio setting values that are set to any of the radio communication units 21-1 to 21-m by the setting policy specified by the policy number. For example, in the radio setting, the basic rate, the minimum data rate, the connection permission power threshold, the disconnection process power threshold, and the like are set.

Here, in the illustrated setting policies, the terminal station 4 that is compatible with only wireless LAN and is not compatible with cellular communication is connected to the radio communication unit 21-1 to which the policy number 01 is applied, and the terminal station 4 that is compatible with wireless LAN and cellular communication is connected to the radio communication unit 21-2 to which the policy number 02 is applied.

For the basic rate and the minimum data rate, the lower the value, the wider the area available for radio communication, but the lower the value, the lower the communication speed at the edge of the area.

In view of this, the policy calculation unit 32 performs the calculation for the setting policy of the policy number 01 in such a manner that the values of the basic rate and the minimum data rate are small to widen the area available for radio communication as much as possible. On the other hand, the policy calculation unit 32 performs the calculation for the setting policy of the policy number 02 in such a manner that the values of the basic rate and the minimum data rate are high to a certain degree.

The connection permission power threshold is a power threshold for determining whether to permit the connection when the base station 2 receives a connection requesting signal from the terminal station 4. The disconnection process power threshold is a power threshold for determining whether to disconnect the terminal station 4 wirelessly connected to the base station 2. For example, for the connection permission power threshold and the disconnection process power threshold, when the value is set to a high value, the area for radio connection is small, but the power in established radio connection is high.

In view of this, the policy calculation unit 32 performs the calculation for the setting policy of the policy number 01 in such a manner that the connection permission power threshold and the disconnection process power threshold are not set to widen the area as much as possible. On the other hand, the policy calculation unit 32 performs the calculation for the setting policy of the policy number 02 in such a manner that the value is higher than the reception sensitivity (e.g., −82 dBm) defined by the standard.

Figure 6:
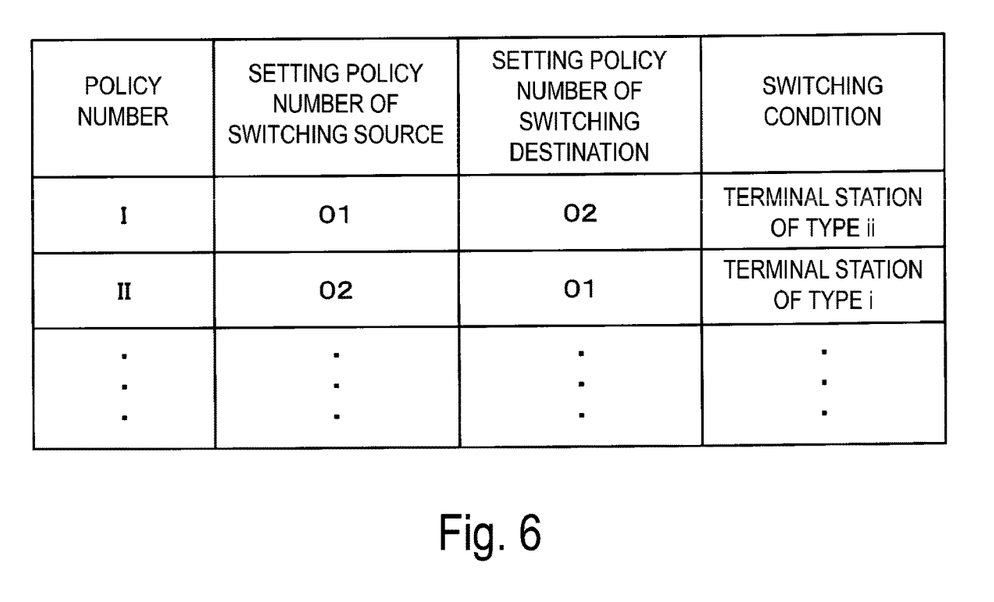
FIG. 6 illustrates an exemplary switching policy.

FIG. 6 illustrates an exemplary switching policy. As illustrated in FIG. 6, the switching policy includes the policy number, the setting policy number of the switching source, the setting policy number of the switching destination, and the switching condition, for example.

For example, when the terminal station 4 of the type corresponding to the switching condition is connected to the radio communication unit 21 in which the setting policy specified by the setting policy number of the switching source is set, connection destination of the terminal station 4 is switched to the radio communication unit 21 in which the setting policy specified by the setting policy number of the switching destination is set.

Figure 7:
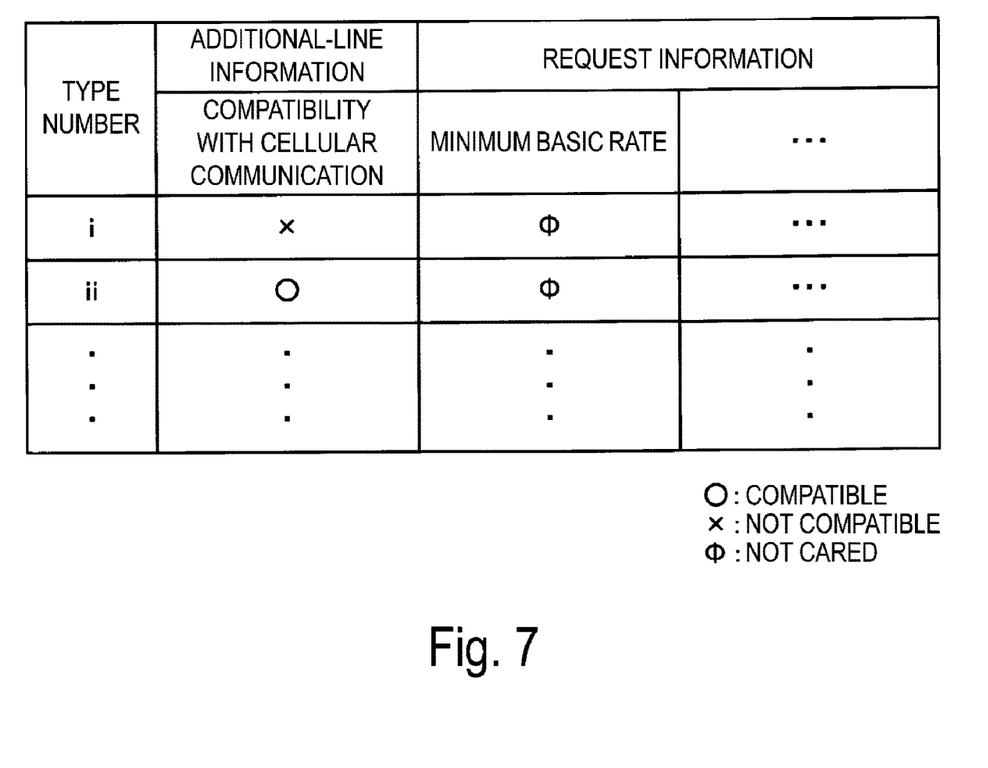
FIG. 7 illustrates exemplary type information of the terminal station.

FIG. 7 illustrates exemplary type information of the terminal station 4. As illustrated in FIG. 7, the type information of the terminal station 4 includes the type number, the additional-line information, and the request information. In the additional-line information, the compatibility with cellular communication is set, for example. In the request information, the minimum basic rate, the minimum data rate, the connection permission power threshold, the disconnection process power threshold, and the like are set, for example.

It is to be noted that while the type of the terminal station 4 is defined by the compatibility with cellular communication in the example illustrated in FIG. 7, the present invention is not limited thereto.

Figure 8:
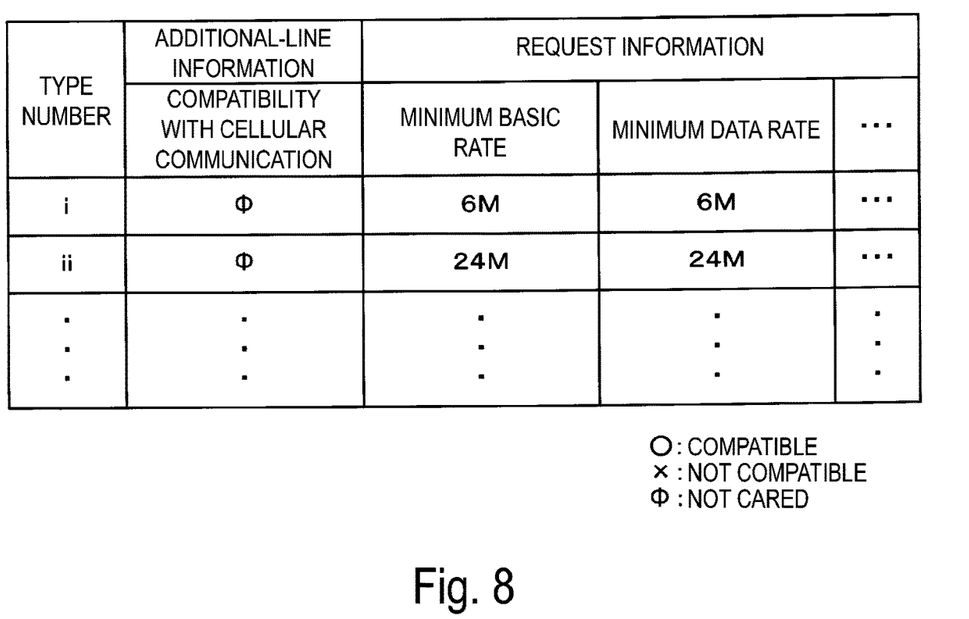
FIG. 8 illustrates another exemplary type information of the terminal station.

FIG. 8 illustrates another exemplary type information of the terminal station 4. As illustrated in FIG. 8, for the type information of the terminal station 4, the type of the terminal station 4 may be determined based on, for example, a difference in the minimum basic rate and the minimum data rate of the request information, a combination of the request information or the like, regardless of the compatibility with cellular communication.

Next, an exemplary operation of the radio communication system 1 is described.

Figure 9:
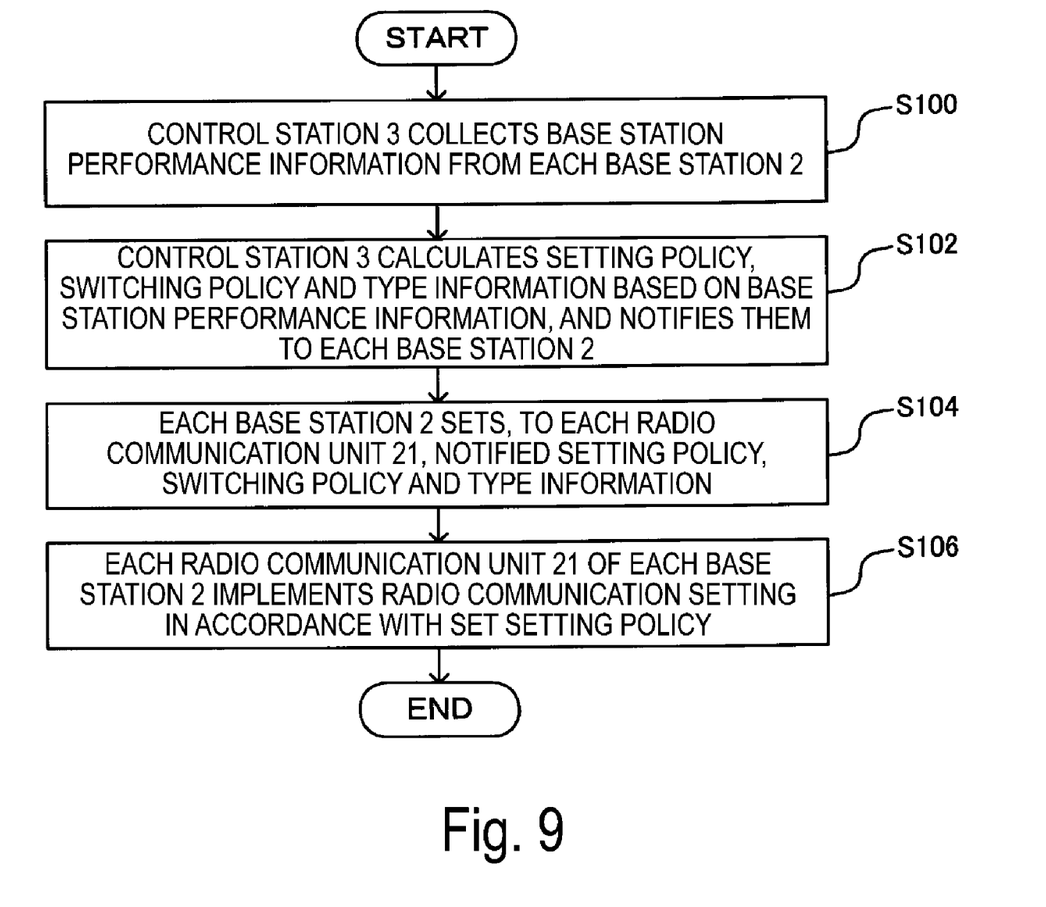
FIG. 9 is a flowchart illustrating an exemplary operation in a case where the radio communication system performs an initial setting for each base station.

FIG. 9 is a flowchart illustrating an exemplary operation of a case where an initial setting for each base station 2 is performed by the radio communication system 1. First, the control station 3 collects the base station performance information from each base station 2 (S100).

Next, on the basis of the base station performance information collected from each base station 2, the control station 3 calculates the setting policy, the switching policy and the type information, and notifies them to each base station 2 (S102).

For example, for the base station 2 in which the number of the radio communication units 21 is 2 (m=2), the control station 3 calculates the setting policy, the switching policy and the type information on the basis of the base station performance information (the number of the radio communication units 21) of the base station 2.

At this time, the policy calculation unit 32 calculates different setting policies for the radio communication units 21-1 and 21-2 of the base station 2. For example, in the case where the radio communication unit 21-1 is caused to accommodate the terminal station 4 that is not compatible with cellular communication and the radio communication unit 21-2 is caused to accommodate the terminal station 4 that is compatible with cellular communication, the policy calculation unit 32 calculates setting policies in which the policy numbers are 01 and 02 (FIG. 5). Further, the policy calculation unit 32 calculates switching policies in which the policy numbers are I and II (FIG. 6) and type information in which the type numbers are i and ii (FIG. 7).

Next, each base station 2 sets, to each radio communication unit 21 of its own station, the setting policy, the switching policy and the type information notified from the control station 3 (S104).

Then, each radio communication unit 21 of each base station 2 implements a radio communication setting in accordance with the set setting policy (S106).

Figure 10:
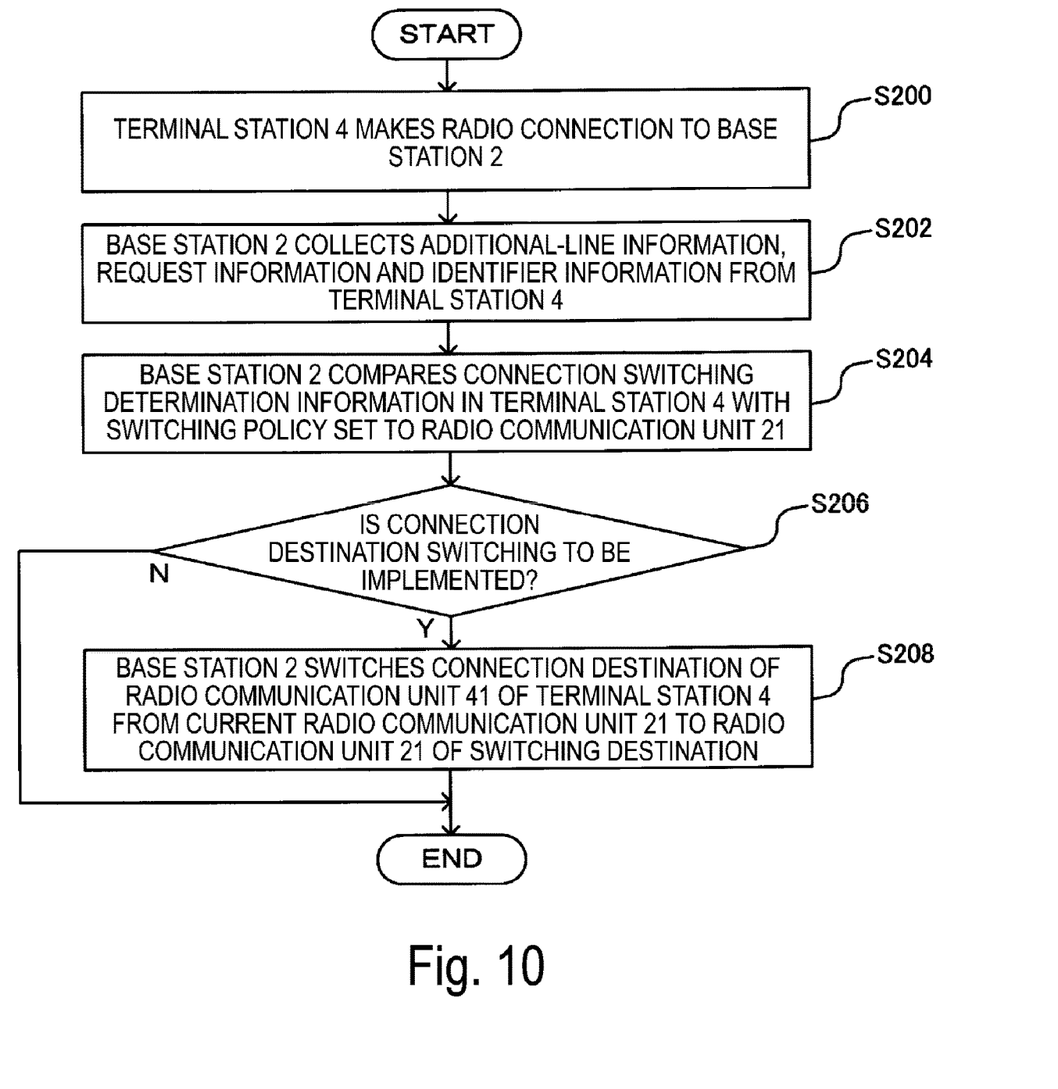
FIG. 10 is a flowchart illustrating an exemplary operation of the radio communication system when the terminal station is connected to the base station.

FIG. 10 is a flowchart illustrating an exemplary operation of the radio communication system 1 when the terminal station 4 is connected to the base station 2. First, the terminal station 4 makes a radio connection to the base station 2 (S200).

The base station 2 collects the additional-line information, the request information, and the identifier information from the connected terminal station 4 (S202).

Next, in the base station 2, the connection switching determination information in the terminal station 4 and the switching policy set to the radio communication unit 21 connected to the terminal station 4 are compared with each other by that radio communication unit 21, for example (S204). The process of S204 may be performed by a control unit (not illustrated) or the like.

Then, on the basis of the result of the comparison, the radio communication unit 21 determines whether to implement connection destination switching for the terminal station 4 (S206). When the connection destination switching is to be implemented (S206: Yes), the radio communication unit 21 proceeds the process to S208, and when the connection destination switching is not to be implemented (S206: No), the process is terminated.

The base station 2 switches the connection destination of the radio communication unit 41 of the terminal station 4 from the current radio communication unit 21 to the radio communication unit 21 of the switching destination set by switching policy (S208).

It is to be noted that the switching at the process of S208 may be performed in such a manner that the currently connected radio communication unit 21 (switching source) sends a switching control signal of designating the radio communication unit 21 of the switching destination to the terminal station 4, for example. In addition, the switching at the process of S208 may be performed in such a manner that the currently connected radio communication unit 21 (switching source) does not respond to a signal from the terminal station 4 and the radio communication unit 21 of the switching destination responds to a signal from the terminal station 4, so as to prompt the terminal station 4 to voluntarily switch the radio connection destination to the radio communication unit 21 of the switching destination.

As described above, on the basis of the additional-line information, the request information and the identifier information of the base station 2 collected by the terminal station 4, the radio communication system 1 calculates the setting policy and the switching policy for each of the radio communication units 21-1 to 21-*m*, and sets the terminal station 4 to be connected for each of the radio communication units 21-1 to 21-*m*. Thus, it is possible to achieve an efficient radio communication in the case where the terminal station 4 that is compatible with a predetermined communication standard and the terminal station 4 that is compatible with another communication standard in addition to the predetermined communication standard are mixed.

It is to be noted that the base station 2, the control station 3 and the terminal station 4 in the above-described embodiment may be implemented by a general-purpose computer as well as by a dedicated apparatus. In this case, the base station 2, the control station 3 and the terminal station 4 may be implemented by recording programs for implementing the functions of the stations in a computer-readable recording medium and causing a computer system to read the program recorded in the recording medium for execution.

Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system.

Further, "computer-readable recording media" may include those that hold the program dynamically for a short period of time, such as communication lines when the program is transmitted over a network such as the Internet or communication lines such as telephone lines, or those that hold the program for a certain period of time, such as a volatile memory inside a computer system that serves as the server or client in that case.

The above-mentioned program may be used to implement some of the above-mentioned functions, and further, the above-mentioned functions may be implemented in combination with a program that is already recorded in a computer system. In addition, the above-mentioned program may be implemented using hardware such as a programmable logic device (PLD) or a field programmable gate array (FPGA).

Although the embodiment of the present invention has been described above with reference to the drawings, it is clear that the above-mentioned embodiment is merely an example of the present invention and that the present invention is not limited to the above-mentioned embodiment. Therefore, additions, omissions, substitutions, and other modifications of elements may be made insofar as they are within the technical concept and scope of the invention.

REFERENCE SIGNS LIST

1 Radio communication system
2 Base station
3 Control station
4-1 to 4-n Terminal station
10 Network
20 Antenna
21-1 to 21-m Radio communication unit
22 Additional-line information collection unit
23 Request information collection unit
24 Identifier collection unit
25 Information processing unit
26 Information notification unit
27 Communication unit
28 Setting unit
31 Communication unit
32 Policy calculation unit
40 Antenna
41 Radio communication unit
42 Additional-line information notification unit
43 Request information notification unit
44 Identifier notification unit

The invention claimed is:

1. A radio communication method of connecting a base station with a plurality of terminal stations, the base station including a plurality of radio communication units in accordance with a predetermined communication standard, the method comprising:
   collecting, by the base station, from each of the plurality of terminal stations, additional-line information regarding whether the terminal station is compatible with an additional communication standard that is different from the predetermined communication standard, where the additional line information is collected from each of the plurality of terminal stations;
   collecting, by the base station, from each of the plurality of terminal stations, request information specifying a radio setting for a radio communication unit of a terminal station of the plurality of terminal stations and identifier information that identifies the terminal station of the plurality of terminal stations, where the request information and the identifier information is collected from each of the plurality of terminal stations;
   calculating, by the base station, a setting policy defining a radio setting for each of the plurality of radio communication units and a switching policy defining a condition for a destination for the plurality of radio communication units, where the calculation is based on the additional line information, the request information, and the identifier information; and
   setting, by the base station, a setting policy and a switching policy for each of the plurality of radio communication units of the base station to the calculated setting policy and the calculated switching policy, respectively,
   wherein the base station is stationary within a service area and is directly connected to a network via a landline connection;
   the plurality of the terminal stations are mobile, resides within the service area, and are wirelessly connected to the base station;
   the predetermined communication standard is a communication standard for configuring a wireless LAN;
   the additional communication standard is a communication standard for implementing cellular communication; and
   the radio setting defines at least one of a basic rate, a minimum data rate, a connection permission power threshold, and a disconnection permission power threshold.

2. The radio communication method according to claim 1, wherein the radio setting of the setting policy defines a basic rate, a minimum data rate, a connection permission power threshold, and a disconnection permission power threshold.

3. A base station configured to connect a plurality of terminal stations, the base station comprising:
   a plurality of radio communication units compatible with a predetermined communication standard;
   an additional-line information collection unit configured to collect, from each of the plurality of terminal stations, additional-line information regarding whether each of the plurality of terminal stations is compatible with an additional communication standard that is different from the predetermined communication standard;
   a request information collection unit configured to collect, from each of the plurality of terminal stations, request information regarding a radio setting of each of the plurality of terminal stations;
   an identifier collection unit configured to collect, from each of the plurality of terminal stations, identifier information that identifies each of the plurality of the terminal stations;
   a setting unit configured to set, for each of the plurality of radio communication units, a terminal station of the plurality of terminal stations to be connected in accordance with a switching policy defining a condition for a destination for the plurality of radio communication units and a setting policy defining a radio setting for each of the plurality of radio communication units,
   the switching policy and the setting policy being calculated based on the additional-line information, the request information, and the identifier information that are collected,
   wherein the base station is stationary within a service area and is directly connected to a network via a landline connection;

the plurality of the terminal stations are mobile, resides within the service area, and are wirelessly connected to the base station;
the predetermined communication standard is a communication standard for configuring a wireless LAN;
the additional communication standard is a communication standard for implementing cellular communication; and
the radio setting defines at least one of a basic rate, a minimum data rate, a connection permission power threshold, and a disconnection permission power threshold.

4. The base station according to claim 3, wherein the radio setting of the setting policy defines a basic rate, a minimum data rate, a connection permission power threshold, and a disconnection permission power threshold.

5. A radio communication system comprising:
a plurality of base stations including a plurality of radio communication units that are compatible with a predetermined communication standard and are connectable to a plurality of terminal stations; and
a control station configured to control each of the plurality of base stations, wherein each of the plurality of base stations includes:
an additional-line information collection unit configured to collect, from each of the plurality of terminal stations, additional-line information regarding whether a terminal station of the plurality of terminal stations is compatible with an additional communication standard that is different from the predetermined communication standard;
a request information collection unit configured to collect, from each of the plurality of terminal stations, request information regarding a radio setting of each of the plurality of terminal stations;
an identifier collection unit configured to collect, from each of the plurality of terminal stations, identifier information that identifies each of plurality of the terminal stations; and
a setting unit configured to set, for each of the plurality of radio communication units, the terminal station to be connected in accordance with a setting policy and a switching policy, and
the control station includes:
a policy calculation unit configured to calculate a switching policy defining a condition for a destination for the plurality of radio communication units and a setting policy including a setting for each of the plurality of radio communication units based on the additional-line information, the request information, and the identifier information that are collected by each of the plurality of base stations; and
a communication unit configured to transmit, to each of the plurality of base stations, the setting policy and the switching policy that are calculated by the policy calculation unit,
wherein the base station is stationary within a service area and is directly connected to a network via a landline connection; and
the plurality of the terminal stations are mobile, resides within the service area, and are wirelessly connected to the base station;
the predetermined communication standard is a communication standard for configuring a wireless LAN;
the additional communication standard is a communication standard for implementing cellular communication; and
the radio setting defines at least one of a basic rate, a minimum data rate, a connection permission power threshold, and a disconnection permission power threshold.

6. The radio communication system according to claim 5, wherein the radio setting of the setting policy defines a basic rate, a minimum data rate, a connection permission power threshold, and a disconnection permission power threshold.

* * * * *